(12) United States Patent
Mann

(10) Patent No.: US 8,786,474 B1
(45) Date of Patent: Jul. 22, 2014

(54) APPARATUS FOR PROGRAMMABLE METASTABLE RING OSCILLATOR PERIOD FOR MULTIPLE-HIT DELAY-CHAIN BASED TIME-TO-DIGITAL CIRCUITS

(71) Applicants: Kabushiki Kaisha Toshiba, Minato-ku (JP); Toshiba Medical Systems Corporation, Otawara (JP)

(72) Inventor: Gregory J. Mann, Oak Park, IL (US)

(73) Assignees: Kabushiki Kaisha Toshiba, Minato-ku (JP); Toshiba Medical Systems Corporation, Otawara-shi (JP)

( * ) Notice: Subject to any disclaimer, the term of this patent is extended or adjusted under 35 U.S.C. 154(b) by 0 days.

(21) Appl. No.: 13/841,364

(22) Filed: Mar. 15, 2013

(51) Int. Cl.
*H03M 1/10* (2006.01)

(52) U.S. Cl.
USPC ........... 341/120; 341/110; 341/166; 341/155; 345/87; 345/90; 345/98; 345/102; 455/103; 455/501; 455/503; 375/362; 250/362; 250/361 R; 368/113; 368/120

(58) Field of Classification Search
CPC ......... H03M 1/14; H03M 1/10; H03M 1/365; H03M 1/1245; H04H 20/67; H04N 5/378; H03L 7/18; H03L 7/085; H03L 7/089; H03L 7/1976; G06J 1/00; H03K 7/08; G06F 1/025; G02F 1/1323; G02F 1/1347; G04F 10/06; G04F 10/005; G11C 11/4094; G11C 7/12; G11C 7/14; G11C 7/109; G11C 7/1075; G11C 7/1057; G11C 7/1009; G11C 7/1078; G11C 7/1093; G11C 7/1045; G11C 7/1066

USPC .................. 341/110, 120, 155, 166; 375/362; 345/87, 90, 98, 102; 455/103, 501, 455/503; 250/362, 361 R; 368/113, 120
See application file for complete search history.

(56) References Cited

U.S. PATENT DOCUMENTS

| | | | |
|---|---|---|---|
| 6,741,505 B2 * | 5/2004 | Yokozeki | 365/189.15 |
| 7,663,946 B2 * | 2/2010 | Kim | 365/194 |
| 7,973,749 B2 * | 7/2011 | Uehara et al. | 345/87 |
| 7,986,256 B2 * | 7/2011 | Yamamoto et al. | 341/155 |
| 8,022,849 B2 * | 9/2011 | Zhang et al. | 341/142 |
| 8,164,493 B2 * | 4/2012 | Hsieh | 341/110 |
| 8,222,607 B2 * | 7/2012 | Mann | 250/362 |
| 8,456,554 B2 * | 6/2013 | Takahashi | 348/294 |
| 8,531,322 B2 * | 9/2013 | Cao et al. | 341/111 |

* cited by examiner

*Primary Examiner* — Lam T Mai
(74) *Attorney, Agent, or Firm* — Oblon, Spivak, McClelland, Maier & Neustadt, L.L.P.

(57) ABSTRACT

An apparatus and method for inserting delay into a start signal of a metastable ring oscillator chain-based time-to-digital circuit (TDC). Included therein is a signal generating circuit that generates the start signal, a plurality of carry elements connected as a chain, each of the carry elements having an input to receive a stop signal, a delay chain circuit including one or more delay modules selected from the plurality of carry elements, at least one feedback line connected between at least one of the delay modules and the signal generating circuit, and a plurality of enable inputs each provided in a respective one of the delay modules. The delay chain circuit generates an amount of delay based on a delay selection signal that is received at the enable inputs and that selects the amount of delay. The delay chain circuit additionally provides the selected amount of delay to the signal generating circuit, which incorporates the delay into the start signal.

16 Claims, 7 Drawing Sheets

APPARATUS FOR PROGRAMMABLE METASTABLE RING OSCILLATOR PERIOD FOR MULTIPLE-HIT DELAY-CHAIN BASED TIME-TO-DIGITAL CIRCUITS

CROSS-REFERENCE TO RELATED APPLICATIONS

The present application is related to U.S. Pat. No. 8,222,607, the contents of which are incorporated herein by reference.

FIELD

The embodiments described herein relate generally to a delay circuit for a metastable ring oscillator time-to-digital converter (TDC) device and associated methodology for improved measurement accuracy and resolution.

BACKGROUND

A time-to-digital-converter is often used to measure timing in a gamma ray detector. A TDC accurately converts the realization of an event into a number than can be related to the time the event occurred. Various methods exist to perform this task. Among others, counting a large number of very fast logic transitions between coarse clock cycles has been used to perform this task. In some cases, it may be desirable to indicate the occurrence of a series of events known to be generated sequentially. For instance, the time a rising signal takes to reach a pre-determined set of threshold values can be very useful information.

Time-to-digital converters have also been implemented with a variety of architectures, such as a classic delay chain having a single chain of identical delay elements connected in series or a Vernier delay chain.

An essential component of time-of-flight positron emission tomography (PET) systems is the time-to-digital converters that are used to measure the arrival time of detected photons at the detector. The measured time can be used to create a bound on the line-of-response, which can be used to estimate the position at which the positron emission event took place. As the accuracy of the TDC increases the bound becomes tighter, providing more accurate position information.

The accuracy of the delay-chain-based TDC is dependent upon the size in time of the sampled steps of the delay chain. In FPGA-based implementations of delay-chain TDCs, the sampled steps can vary by a significant amount depending upon the physical limitations of the FPGA. In some cases variations of up to ten times have been observed.

While coarse offsets can be designed into an FPGA-based implementation and utilized to improve timing accuracy over single-edge delay chain based TDCs, there exists significant manufacturing-based variation in the speed of on-chip circuits. These variations will affect the optimal delay between edges that should be used to extract the maximal accuracy from the collective TDC circuit. Thus, there is a need to compensate for the manufacturing variation so as to increase the timing accuracy of the implemented TDC on every chip.

BRIEF DESCRIPTION OF THE DRAWINGS

A more complete appreciation of the embodiments described herein, and many of the attendant advantages thereof will be readily obtained as the same becomes better understood by reference to the following detailed description when considered in connection with the accompanying drawings, wherein.

DETAILED DESCRIPTION

Figure 1:
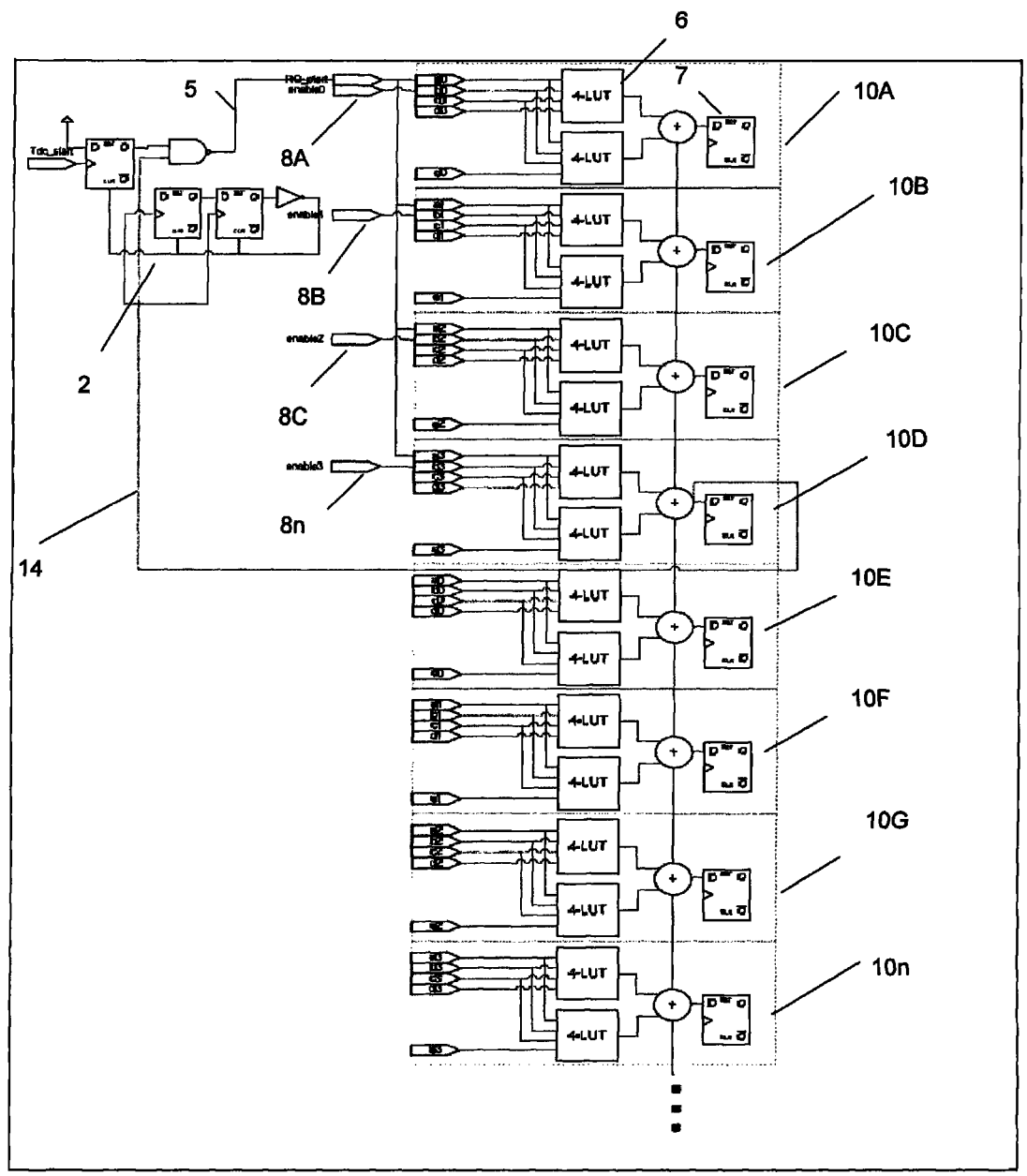
FIG. 1 is a schematic drawing of an apparatus for introducing propagation delay to a chain-based metastable ring oscillator time-to-digital circuit (TDC) according to one embodiment.

In one embodiment, there is described an apparatus for inserting delay into a start signal of a metastable ring oscillator chain-based time-to-digital circuit (TDC). The apparatus includes a signal generating circuit that generates the start signal, a plurality of carry elements connected as a chain, each of the carry elements having an input to receive a stop signal, a delay chain circuit including one or more delay modules selected from the plurality of carry elements, at least one feedback line connected between at least one of the delay modules and the signal generating circuit, and a plurality of enable inputs each provided in a respective one of the delay modules. The delay chain circuit generates an amount of delay based on a delay selection signal that is received at the enable inputs and that selects the amount of delay. The delay chain circuit also provides the selected amount of delay to the signal generating circuit, which incorporates the delay into the start signal.

According to another embodiment of the apparatus, the signal generating circuit incorporates the delay into the start signal between edges in the signal.

According to another embodiment of the apparatus, the apparatus further includes a time determining circuit that determines the time at which an event occurred based on state information transferred from each of the delay elements.

According to another embodiment of the apparatus, the delay selection signal provides an indication to each delay module whether the respective delay module is activated to generate delay.

According to another embodiment of the apparatus, the signal generating circuit includes at least one flip-flop.

According to another embodiment of the apparatus, each delay module includes at least one hardware based look up table (LUT).

According to another embodiment of the apparatus, each delay module includes at least one flip-flop.

According to another embodiment of the apparatus, the delay selection signal is determined by user input.

According to another embodiment of the apparatus, the delay selection signal is determined by an algorithm which determines the optimal propagation delay for the TDC.

In one embodiment, there is described a method for inserting delay into a start signal of a metastable ring oscillator chain-based time-to-digital circuit (TDC). The method includes the steps of receiving a delay selection signal indicating a determination of an amount of delay to incorporate into the start signal, activating one or more delay modules based on the delay selection signal, the one or more delay modules selected from a plurality of carry elements connected as a chain, generating delay by routing a delay signal through an activated one of the one or more delay modules, and transmitting the delay signal to a signal generating circuit configured to generate the start signal to incorporate the delay signal.

According to another embodiment of the method, the method further includes the steps of receiving the delay signal at the signal generating circuit, generating a start signal incorporating the delay signal into the start signal, transmitting the start signal generated by the generating to the plurality of carry elements connected as a chain, receiving a stop signal at each of the plurality of carry elements and transmitting state information for each of the carry elements to a time determining circuit that determines the time at which an event occurred based on the state information.

According to another embodiment of the method, the generating step further includes the step of generating delay by routing the delay signal through the activated one of the one or more delay modules and each delay module following the activated one of the one or more delay modules until the delay signal reaches a delay module designated as a final delay module.

According to another embodiment of the method, the final delay module has a feedback line connected thereto.

According to another embodiment of the method, the feedback line is connected to the signal generating circuit.

According to another embodiment of the method, the step of generating delaying further includes the step of generating delay by routing the start signal through a logic array block look-up table (LUT) of the activated one of the one or more delay modules.

In one embodiment, there is described a method of calibrating a metastable ring oscillator chain-based time-to-digital circuit (TDC). The method includes the steps of receiving a delay selection signal indicating a determination of an amount of delay to incorporate into the start signal, activating one or more delay modules based on the delay selection signal, the one or more delay modules selected from a plurality of carry elements connected as a chain, generating delay by routing a delay signal through an activated one of the one or more delay modules, transmitting the delay signal to a signal generating circuit of the TDC which is configured to generate the start signal to incorporate the delay signal, measuring performance of the TDC using the delay selection signal to obtain an evaluation value for the delay selection signal, repeating the receiving, activating, generating, transmitting, and measuring step for each possible delay selection signal to obtain a corresponding evaluation value for each possible delay selection signal, and determining which of the possible delay selection signals results in a highest evaluation value.

In general, time-to-digital converter (TDC) devices according to exemplary embodiments of the present advancements each include at least one delay chain circuit that generates a value corresponding to a time period corresponding to a start signal and a stop signal.

The present advancements provide a calibration path for a TDC implemented as a metastable ring oscillator delay chain implemented on programmable logic devices e.g., Field Programmable Gate Arrays (FPGAs).

Metastable ring oscillators are used to generate multiple transitions on a signal, each of which has a fixed time relationship to the ring oscillator input. The accuracy of a delay chain-based TDC is dependent upon the size in time of the sampled steps of the delay chain. In FPGA-based implementations of delay chain TDCs, these sampled steps can vary by a significant amount. By utilizing a metastable ring oscillator, multiple edges can be propagated through the chain of a multi-hit TDC, and as one edge is measured in a large bin, a subsequent edge or edges can be measured in smaller bins.

The present advancements provide a way by which TDCs implemented as a single multi-hit detectable delay chain with a triggerable metastable ring oscillator at the start of the chain on programmable logic devices (i.e. FPGAs), can be calibrated. Due to inherent differences in propagation delays for silicon devices caused by manufacturing variances, as well as non-uniformity in tap delays on the delay chain (e.g. intra-logic array block delays versus inter-logic array block delays on FPGAs), a fixed ring-oscillator period will not necessarily yield the optimal performance across different physical dies. The present advancements provide a way by which the period of the metastable ring oscillator circuit can be modified. Thus, by adjusting the ring oscillator period, the time between propagated edges can be calibrated to provide the optimal spacing to provide compensation for structural non-linearity in the delay chain.

Referring now to the drawings, wherein like reference numerals designate identical or corresponding parts throughout the several views, FIG. 1 is a schematic drawing of a FPGA-based metastable ring oscillator time-to-digital circuit. This circuit can be used to both provide calibration paths for introducing delay into the oscillated signal and to implement the time-to-digital conversion.

As is illustrated in FIG. 1, a TDC chain is provided, which includes a number of fast-carry-chain elements 10A-n. Each fast-carry-chain element 10A-n includes at least one FPGA implemented n-bit look up table (LUT) 6, a standard full-adder circuit, and a logic element such as a D-type flip-flop 7. The flip flops implement the stop function of the TDC. The stop signal is the clock signal to the flip-flops. The metastable oscillator signal is generated by generating circuit 2.

The fast-carry-chain elements 10A-n of FIG. 1 may be implemented with discrete logic gates, as an Application Specific Integrated Circuit (ASIC), a FPGA, or other Complex Programmable Logic Device (CPLD). In FPGA or CPLD implementations, the device may be coded in VHDL, Verilog or any other hardware description language as a set of computer-readable instructions, and the computer-readable instructions may be stored in electronic memory directly in the FPGA or CPLD, or as separate electronic memory. Further, the electronic memory may be non-volatile, such as a ROM, EPROM, EEPROM, or FLASH memory. The electronic memory may also be volatile, such as static or dynamic RAM, and a processor, such as a microcontroller or microprocessor, may be provided to manage the electronic memory as well as the interaction between the FPGA or CPLD and the electronic memory.

At least one of the fast-carry-chain elements 10A-n includes an enable signal 8A-n as input. The enable signal 8A-n is utilized for the introduction of a delay into the oscillated signal. Signal line 14 provides an example of a feedback line by which the delay is introduced. The feedback line 14 may be positioned on each or any of the fast-carry-chain elements 10A-n. Each fast-carry-chain element 10A-n can be used to introduce a specific or predetermined amount of delay into the signal.

Figure 2:
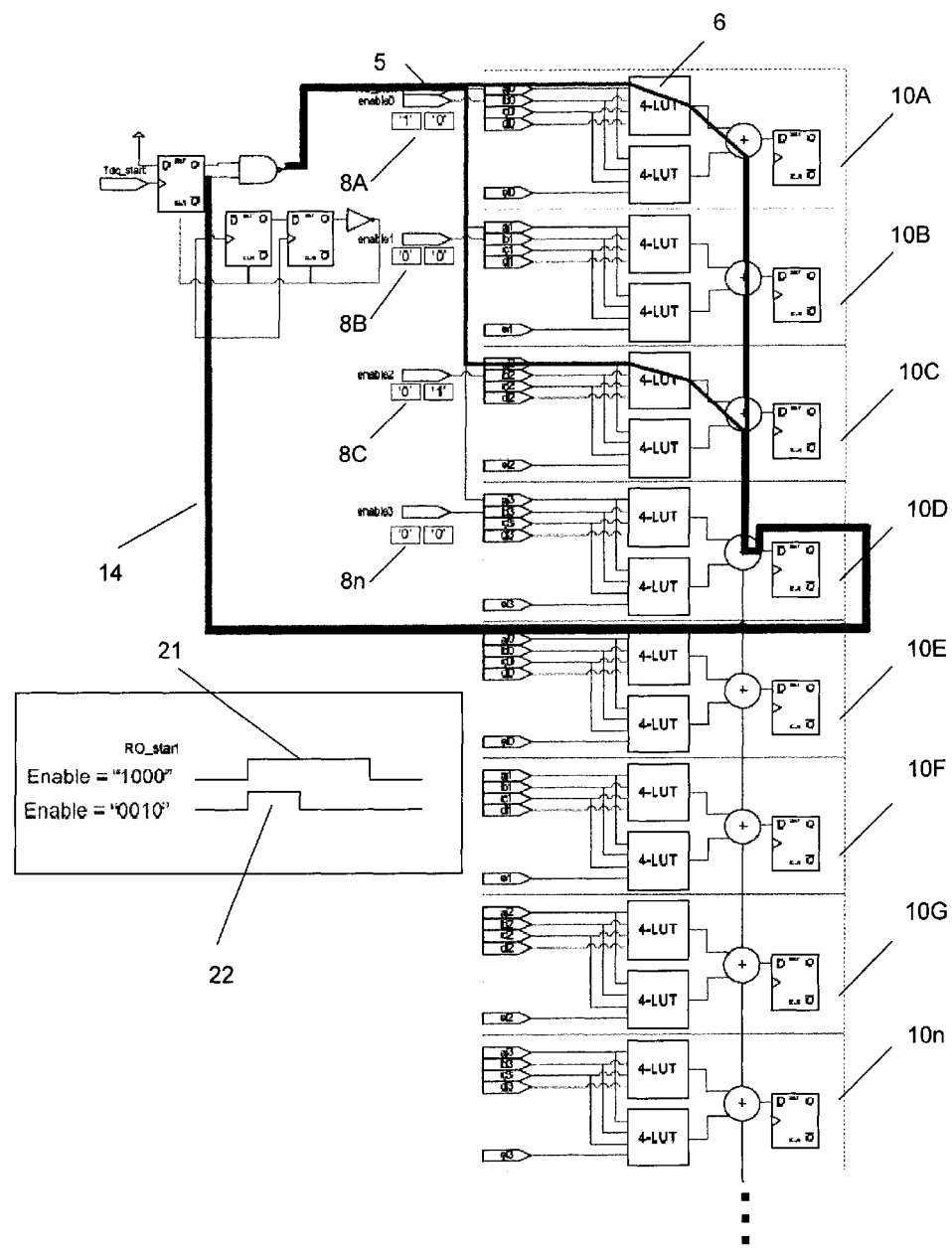
FIG. 2 is a schematic drawing illustrating the operation of the apparatus for introducing propagation delay to a chain-based metastable ring oscillator time-to-digital circuit (TDC) according to one embodiment.

As is shown in FIG. 2, the "RO_Start" signal input 5 is input to the beginning of the TDC chain 10A-n. Each fast-carry-chain element 10A-n includes at least one FPGA LUT that is configured to pass the "RO_Start" signal through to the carryout output of the fast-carry-chain element when the respective enable signal 8A-n is asserted. With the enable signals 8A-n asserted in a one-hot fashion, each possible combination yields a different propagation delay from the "RO_Start" input to the ring oscillator feedback. Utilizing differing combinations of enable signal 8A-n assertions, a combination is obtained that provides the optimal timing accuracy performance for the TDC as a whole.

As is shown in FIG. 2, the enable signal "1000" indicates that the first fast-carry-chain element 10A is enabled. In the first example shown in FIG. 2, the signal then passes through fast-carry-chain elements 10A-10D providing a delay 21. In the second example associated with enable signal "0010", the third fast-carry-chain element 10C is enabled generating a smaller amount of delay 22. In these examples, the feedback line 14 is positioned at the fast-carry-chain element 10D. However, the feedback line 14 can be positioned at any or each of the fast-carry-chain elements 10A-n. In an alternate example, the first "1" in the enable signal indicates the input to the delay chain and the second "1" in the enable signal indicates the output of the delay chain. Thus, if the enable signal was "1001", the first fast-carry-chain element 10A would be activated as the input and the fast-carry-chain element 10D would be activated as the last element in the delay chain.

Applicants note that although a single ring oscillator chain is illustrated, more than one chain may be included in the system. In such an embodiment, the result from the different chains can be combined by way of, for example, averaging to arrive at the final time value at a microprocessor or other calculating circuit.

The FPGA-based implementation makes use of the fast-carry-chain architecture of FPGA devices. These fast-carry-chains are utilized as the delay taps in the delay chain used in the TDC. By routing the metastable ring oscillator output to multiple logic array block (LAB) look-up tables (LUTs) 6, separate enable signals 8A-n routed to the LUTs 6 can activate paths of different propagation delays to the feedback path 14 to the metastable ring oscillator, resulting in programmable delays between rising and falling edges of the metastable ring oscillator output.

The multiple logic array block (LAB) look up tables (LUTs) 6 shown in FIG. 2 may be implemented using FPGAs and are configured to pass the "RO_Start" signal 5 through the fast-carry-chain elements 10A-n, when the respective enable signal 8A-n is activated. By utilizing all possible combinations of enable 8A-n activations, a combination can be determined that provides the optimal timing accuracy performance of the TDC as a whole. The accuracy of the TDC circuit is measured by injecting pairs of start-stop signals of known timing (for example from a function generator). For each configuration of enable signal 8A-n as described above, a histogram of the times between the start and stop, as measured by the TDC in a given configuration, is generated. A distribution of timing values is derived from the histogram. The distribution is analyzed and the quality of the configuration is based on some metric calculated in the distribution. Examples of the metric include but are not limited to the standard deviation or the Full Width Half Max (FWHM). These metrics measure the "width" of the distribution, where a smaller "width" is preferable.

The path used for propagation is known a priori due to dynamically changing the configuration. An external source (such as a predetermined software application) sets the configuration. Since the source is setting the configuration, the source knows the current configuration.

Figure 3:
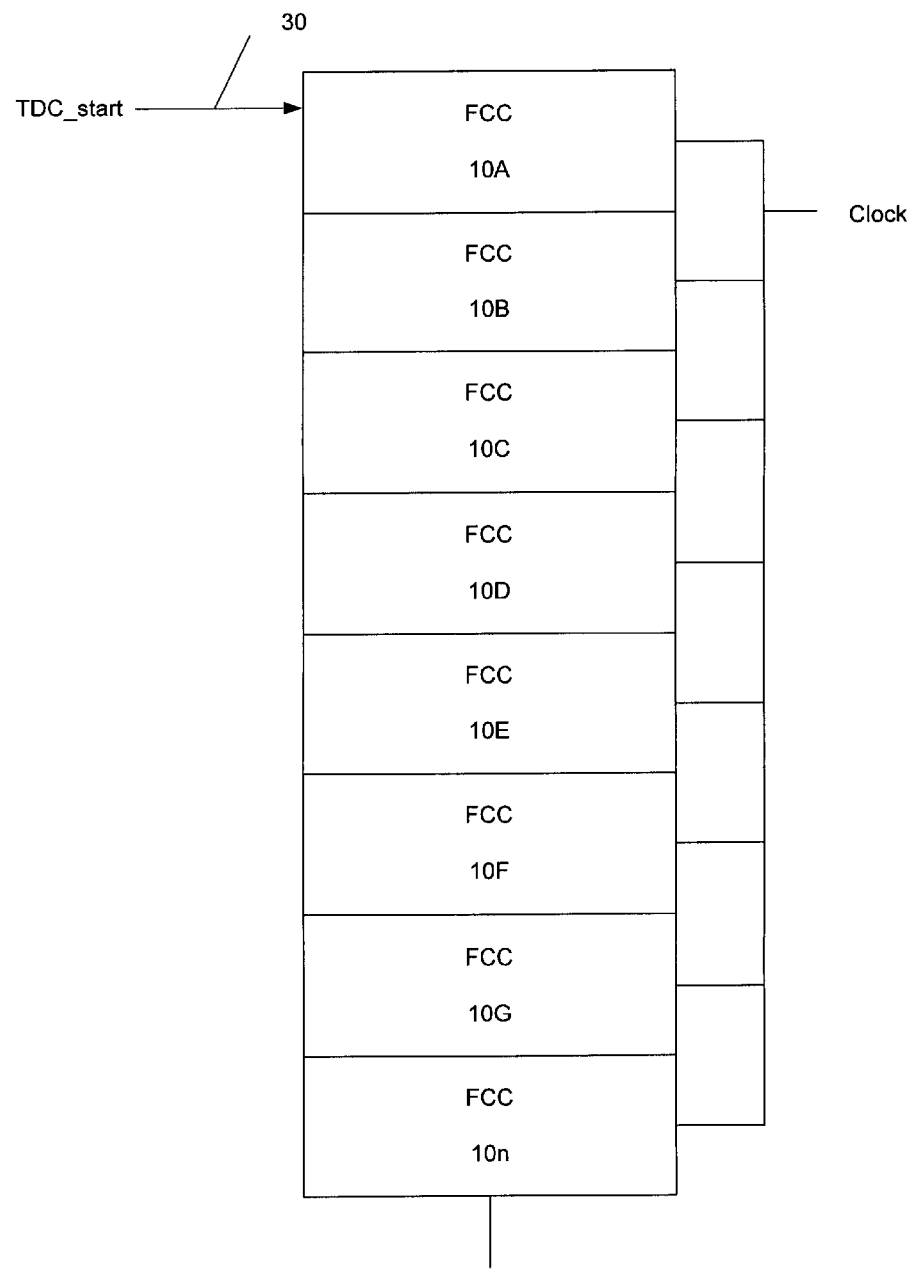
FIG. 3 is another schematic drawing of an apparatus for introducing propagation delay to a plurality of chain-based TDCs according to one embodiment.

FIG. 3 illustrates a view of the system, which implements the time-to-digital conversion using the fast-carry-chain (FCC) elements 10A-n. As illustrated in the figure, the start signal TDC_start is received at input 30 having included therein delay generated by the delay process shown in FIG. 2. The metastable ring oscillator inputs the signal having multiple edges into the chain 10A-n. The stop signal is provided as the clock signal and "freezes" the state of fast-carry-chain elements at the moment the clock signal provides the stop signal. The states of each of the fast-carry-chain elements 10A-n is then output to a CPU or some other microprocessing device or circuit in order to determine the timing of the event. The CPU, microprocessing device or circuit implements a time determining circuit that determines the time at which an event occurred based on state information of each of the fast-carry-chain elements 10A-n.

The TDC chain described above may be, for example, implemented within a PET system. However, the above described TDC chain is not limited to use within a PET system. In such a time-of-flight PET system, a TDC chain typically produces a time stamp with an accuracy of in the range of ps.

A commercial gamma ray detector such as in a PET system includes an array of scintillator crystals coupled to a transparent light guide, which distributes scintillation light over an array of photomultiplier tubes (PMTs) arranged over the transparent light guide. Signals from the PMTs in a same area are generally summed in the analog domain, and then timing is measured based on the leading edge of the summed signal, or event.

For each PMT, there may be an independent electronics path that is used to measure the amplitude of the signal on each PMT. This path may include a filter and an analog-to-digital converter (ADC). The filter, typically a bandpass filter, is used to optimize the signal-to-noise ratio of the measurement and performs an anti-aliasing function prior to conversion to a digital signal by the ADC. The ADC can be a free-running type, running at 100 MHz, for example, in which case a central processing unit performs a digital integration, or the ADC can be a peak-sensing type. The ADC and TDC outputs are provided to the CPU for processing. The processing includes of estimating an energy and position from the ADC outputs, and an arrival time from the TDC output for each event, and may include the application of several correction steps, based on prior calibrations, to improve the accuracy of the energy, position, and time estimates.

As one of ordinary skill in the art would recognize, the CPU can be implemented as discrete logic gates, as an ASIC, a FPGA or other CPLD. An FPGA or CPLD implementation may be coded in VHDL, Verilog or any other hardware description language and the code may be stored in an electronic memory directly within the FPGA or CPLD, or as a separate electronic memory. Further, the electronic memory may be non-volatile, such as ROM, EPROM, EEPROM or FLASH memory. The electronic memory may also be volatile, such as static or dynamic RAM, and a processor, such as a microcontroller or microprocessor, may be provided to manage the electronic memory as well as the interaction between the FPGA or CPLD and the electronic memory.

Alternatively, the CPU may be implemented as a set of computer-readable instructions stored in any of the above-described electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Xenon processor from Intel of America or an Opteron processor from AMD of America and an operating system, such as Microsoft VISTA, UNIX, Solaris, LINUX, Apple, MAC-OSX and other operating systems known to those skilled in the art.

Once processed by the CPU, the processed signals are stored in electronic storage, and/or displayed on display. As one of ordinary skill in the art would recognize, electronic storage may be a hard disk drive, CD-ROM drive, DVD drive, FLASH drive, RAM, ROM or any other electronic storage known in the art. Display may be implemented as an LCD display, CRT display, plasma display, OLED, LED or any other display known in the art. As such, the descriptions of the electronic storage and the display provided herein are merely exemplary and in no way limit the scope of the present advancements.

The CPU can also, in an alternative embodiment, perform calculations to determine the best propagation delay for the TDC chain. Thus, the CPU can use feedback control or other similar mechanisms to determine how much propagation delay to add to the chain to increase the timing accuracy of the implemented TDC. In such an embodiment, the enable signals 8A-n are output by the CPU and input into the respective fast-carry-chain modules.

Figure 4A:
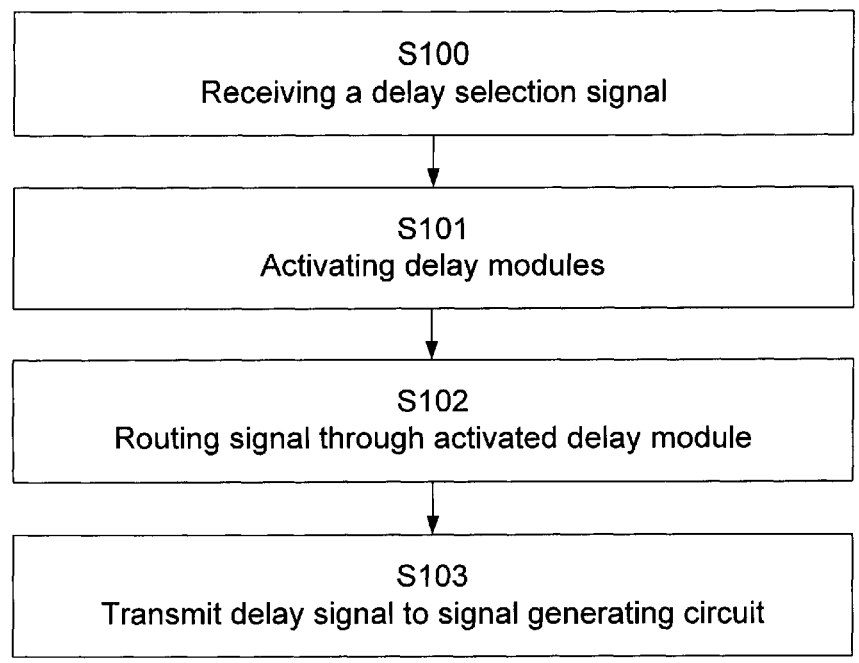
FIG. 4A is a flow diagram illustrating a process of inserting delay into a start signal of a metastable ring oscillator chain-based time-to-digital circuit (TDC)

FIG. 4A illustrates a method inserting delay into a start signal of a metastable ring oscillator chain-based TDC.

In step S100, a delay selection signal, corresponding to enable signals 8A-n, is received indicating a determination of an amount of delay to incorporate into the start signal.

In step S101, one or more delay modules is activated based on the delay selection signal, the one or more delay modules selected from the chain of fast-chain-carry elements 10A-n.

In step S102, delay is generated by routing a delay signal through at least one of the one or more delay modules that has been activated by the delay selection signal. As is described above, the activated delay module may be determined to be the delay module into which the delay signal is first introduced. Therefore, if the delay signal is introduced into a delay module further down the chain from the first module 10A, for example, if the signal is introduced into module 10C as is shown in the example illustrated in FIG. 2, the delay that results from the delay process is less (see delay 22 as compared with delay 21).

In step S103, the delay signal is transmitted to a signal generating circuit 2 that generates the start signal and in doing so incorporates the delay signal into the start signal.

Figure 4B:
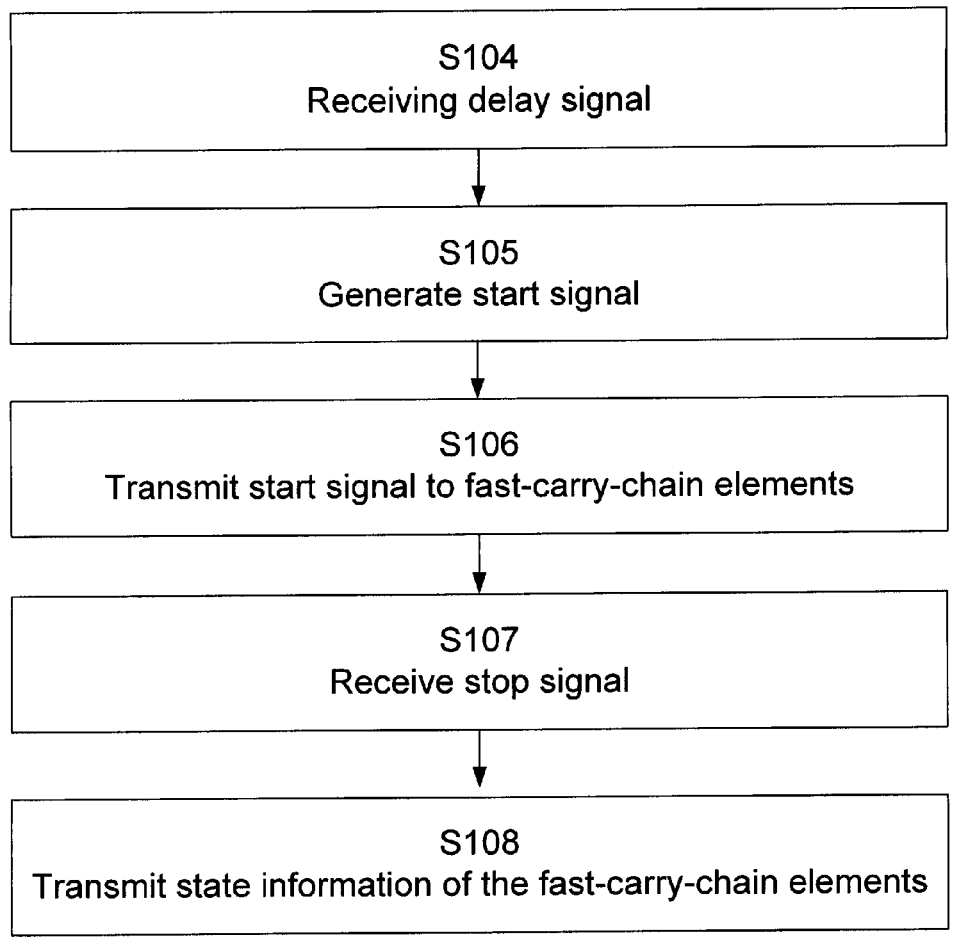
FIG. 4B is a flow diagram illustrating a process of implementing a time-to-digital conversion after the determined delay has been incorporated.

FIG. 4B illustrates a process of implementing a time-to-digital conversion after the determined delay has been incorporated according to one embodiment.

In step S104, the delay signal is received at the signal generating circuit.

In step S105, a start signal incorporating the delay signal into the start signal is generated by the signal generating circuit 2.

In step S106, the generated start signal is transmitted to the chain of fast-carry-chain elements 10A-n via input 5.

In step S107, a stop signal is received at each of the plurality of fast-carry-chain elements 10A-n.

In step S108, state information for each of the fast-carry-chain elements is transmitted to a time determining circuit that determines the time at which an event occurred based on the state information.

Figure 5:
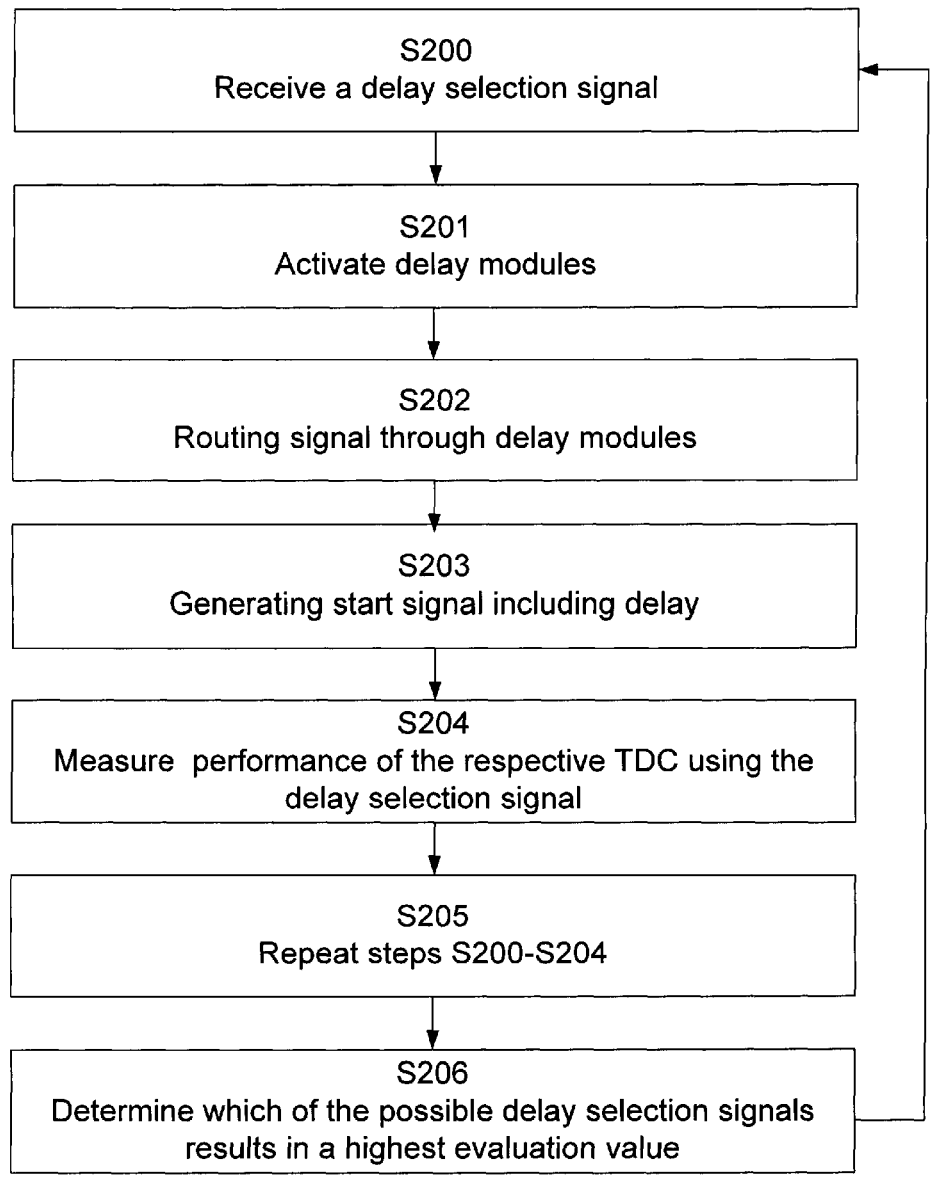
FIG. 5 is a flow diagram illustrating the process for determining the optimal delay according to one embodiment.

FIG. 5 illustrates a method of calibrating a metastable ring oscillator chain-based TDC.

In step S200, a delay selection signal (corresponding to enable signals 8A-n) is received indicating a determination of an amount of delay to incorporate into the start signal.

In step S201, one or more delay modules is activated based on the delay selection signal, the one or more delay modules selected from the chain of fast-chain-carry elements 10A-n.

In step S202, delay is generated by routing a delay signal through at least one of the one or more delay modules that has been activated by the delay selection signal.

In step S203, the delay signal is transmitted to a signal generating circuit 2 that generates the start signal and in doing so incorporates the delay signal into the start signal.

In step S204, the performance of the respective TDC is measured using the delay selection signal to obtain an evaluation value for the delay selection signal. The delay selection signal or group of selection signals are compared with an output result of the TDC system in order to determine an evaluation value which for the delay selection signal(s). The evaluation values are recorded in association with the delay selection signal(s).

In step S205, steps S201-S204 are repeated for each possible delay selection signal or combination to obtain a plurality of evaluation values with one evaluation value for each possible delay selection signal or group of selection signals. Each of these evaluation values is recorded in association with the respective signal or signals.

In step S206, a determination is made regarding which of the possible delay selection signal(s) results in the highest evaluation value. As is described above, the various delay configurations can be evaluated using a technique in which pairs of start-stop signals of known timing (for example from a function generator) are injected into the system. For each configuration of enable0_n and enable1_n pairs as described above, a histogram of the times between the start and stop, as measured by the TDC in a given configuration, is generated. This generation may be performed using a microprocessor implemented histogram generation program. A distribution of timing values is derived from the histogram. The distribution is analyzed and the quality of the configuration is based on a metric calculated in the distribution. Examples of the metric include but are not limited to the standard deviation or the Full Width Half Max (FWHM). The selection signal or signals determined to provide the optimal delay can then be used to provide the optimal delay for the TDC process.

Certain portions of the processing, such as the optimization and the generation of delay selection signal, can be implemented or aided by using some form of computer having at least one microprocessor or by using a processor. As one of ordinary skill in the art would recognize, the computer processor can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog or any other hardware description language and the code may be stored in an electronic memory directly within the FPGA or CPLD, or as a separate electronic memory. Further, the electronic memory may be non-volatile, such as ROM, EPROM, EEPROM or FLASH memory. The electronic memory may also be volatile, such as static or dynamic RAM, and a processor, such as a microcontroller or microprocessor, may be provided to manage the electronic memory as well as the interaction between the FPGA or CPLD and the electronic memory.

Alternatively, the computer processor may execute a computer program including a set of computer-readable instructions that perform the functions described herein, the program being stored in any of the above-described non-transitory electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Xenon processor from Intel of America or an Opteron processor from AMD of America and an operating system, such as Microsoft VISTA, UNIX, Solaris, LINUX, Apple, MAC-OSX and other operating systems known to those skilled in the art.

Figure 6:
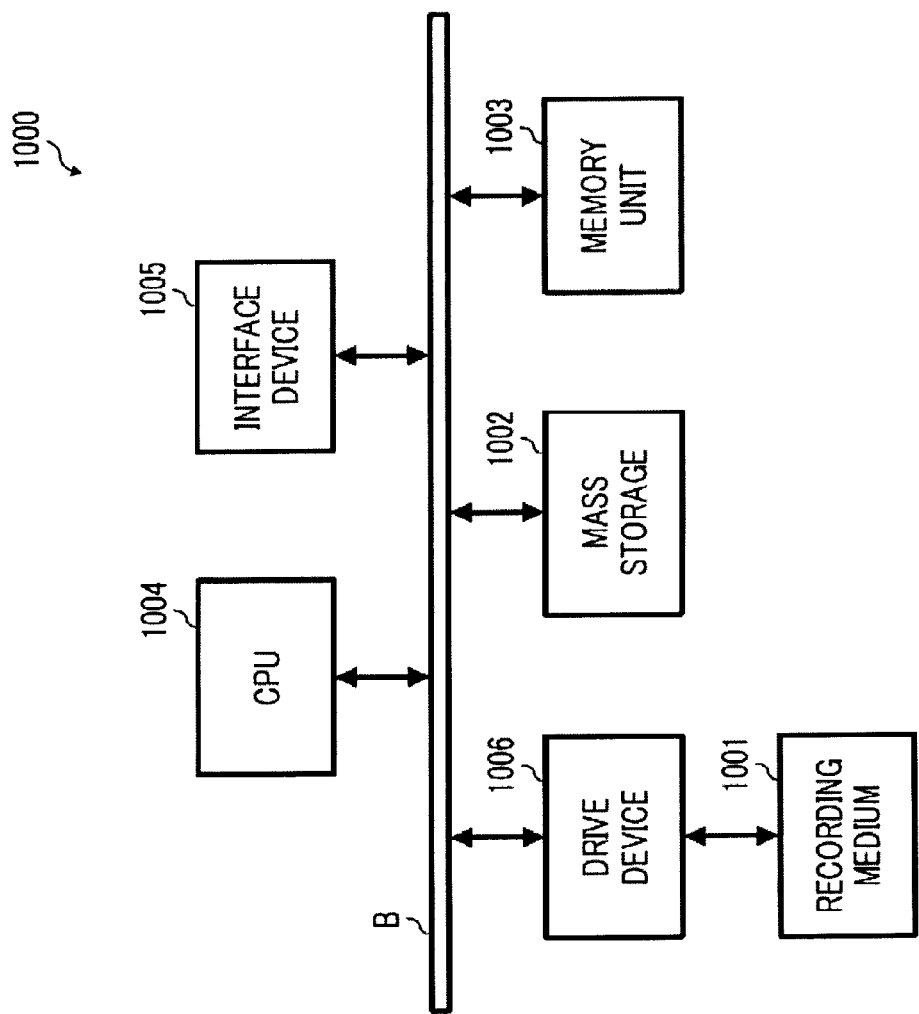
FIG. 6 illustrates a computing device according to one embodiment.

In addition, certain features of the embodiments can be implemented using a computer based system (FIG. 6). The computer 1000 includes a bus B or other communication mechanism for communicating information, and a processor/CPU 1004 coupled with the bus B for processing the information. The computer 1000 also includes a main memory/memory unit 1003, such as a random access memory (RAM) or other dynamic storage device (e.g., dynamic RAM (DRAM), static RAM (SRAM), and synchronous DRAM (SDRAM)), coupled to the bus B for storing information and instructions to be executed by processor/CPU 1004. In addition, the memory unit 1003 may be used for storing temporary variables or other intermediate information during the execution of instructions by the CPU 1004. The computer 1000 may also further include a read only memory (ROM) or other static storage device (e.g., programmable ROM (PROM), erasable PROM (EPROM), and electrically erasable PROM (EEPROM)) coupled to the bus B for storing static information and instructions for the CPU 1004.

The computer 1000 may also include a disk controller coupled to the bus B to control one or more storage devices for storing information and instructions, such as mass storage 1002, and drive device 1006 (e.g., floppy disk drive, read-only compact disc drive, read/write compact disc drive, compact disc jukebox, tape drive, and removable magneto-optical drive). The storage devices may be added to the computer 1000 using an appropriate device interface (e.g., small computer system interface (SCSI), integrated device electronics (IDE), enhanced-IDE (E-IDE), direct memory access (DMA), or ultra-DMA).

The computer 1000 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer 1000 may also include a display controller coupled to the bus B to control a display, such as a cathode ray tube (CRT), for displaying information to a computer user. The computer system includes input devices, such as a keyboard and a pointing device, for interacting with a computer user and providing information to the processor. The pointing device, for example, may be a mouse, a trackball, or a pointing stick for communicating direction information and command selections to the processor and for controlling cursor movement on the display. In addition, a printer may provide printed listings of data stored and/or generated by the computer system.

The computer 1000 performs at least a portion of the processing steps of the invention in response to the CPU 1004 executing one or more sequences of one or more instructions contained in a memory, such as the memory unit 1003. Such instructions may be read into the memory unit from another computer readable medium, such as the mass storage 1002 or a removable media 1001. One or more processors in a multiprocessing arrangement may also be employed to execute the sequences of instructions contained in memory unit 1003. In alternative embodiments, hard-wired circuitry may be used in place of or in combination with software instructions. Thus, embodiments are not limited to any specific combination of hardware circuitry and software.

As stated above, the computer 1000 includes at least one computer readable medium 1001 or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other medium from which a computer can read.

Stored on any one or on a combination of computer readable media, the present invention includes software for controlling the main processing unit 1004, for driving a device or devices for implementing the invention, and for enabling the main processing unit 1004 to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code elements on the medium of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the CPU 1004 for execution. A computer readable medium may take many forms, including but not limited to, non-volatile media, and volatile media. Non-volatile media includes, for example, optical, magnetic disks, and magneto-optical disks, such as the mass storage 1002 or the removable media 1001. Volatile media includes dynamic memory, such as the memory unit 1003.

Various forms of computer readable media may be involved in carrying out one or more sequences of one or more instructions to the CPU 1004 for execution. For example, the instructions may initially be carried on a magnetic disk of a remote computer. An input coupled to the bus B can receive the data and place the data on the bus B. The bus B carries the data to the memory unit 1003, from which the CPU 1004 retrieves and executes the instructions. The instructions received by the memory unit 1003 may optionally be stored on mass storage 1002 either before or after execution by the CPU 1004.

The computer 1000 also includes a communication interface 1005 coupled to the bus B. The communication interface 1004 provides a two-way data communication coupling to a network that is connected to, for example, a local area network (LAN), or to another communications network such as the Internet. For example, the communication interface 1005 may be a network interface card to attach to any packet switched LAN. As another example, the communication interface 1005 may be an asymmetrical digital subscriber line (ADSL) card, an integrated services digital network (ISDN)

card or a modem to provide a data communication connection to a corresponding type of communications line. Wireless links may also be implemented. In any such implementation, the communication interface 1005 sends and receives electrical, electromagnetic or optical signals that carry digital data streams representing various types of information.

The network typically provides data communication through one or more networks to other data devices. For example, the network may provide a connection to another computer through a local network (e.g., a LAN) or through equipment operated by a service provider, which provides communication services through a communications network. The local network and the communications network use, for example, electrical, electromagnetic, or optical signals that carry digital data streams, and the associated physical layer (e.g., CAT 5 cable, coaxial cable, optical fiber, etc). Moreover, the network may provide a connection to a mobile device such as a personal digital assistant (PDA) laptop computer, or cellular telephone.

In the above descriptions, any processes, descriptions or blocks in flowcharts should be understood as representing modules, segments or portions of code which include one or more executable instructions for implementing specific logical functions or steps in the process, and alternate implementations are included within the scope of the exemplary embodiments of the present advancements in which functions may be executed out of order from that shown or discussed, including substantially concurrently or in reverse order, depending upon the functionality involved, as would be understood by those skilled in the art.

While certain embodiments have been described, these embodiments have been presented by way of example only, and are not intended to limit the scope of the inventions. Indeed, the novel methods, apparatuses and systems described herein may be embodied in a variety of other forms; furthermore, various omissions, substitutions and changes in the form of the methods, apparatuses and systems described herein may be made without departing from the spirit of the inventions. The accompanying claims and their equivalents are intended to cover such forms or modifications as would fall within the scope and spirit of the inventions.

The invention claimed is:

1. An apparatus for inserting delay into a start signal of a metastable ring oscillator chain-based time-to-digital circuit (TDC), comprising:
    a signal generating circuit configured to generate the start signal;
    a plurality of carry elements connected as a chain, each of the carry elements having an input to receive a stop signal; and
    a delay chain circuit including one or more delay modules selected from the plurality of carry elements, at least one feedback line connected between at least one of the delay modules and the signal generating circuit, and a plurality of enable inputs each provided in a respective one of the delay modules,
    wherein the delay chain circuit is configured to generate an amount of delay based on a delay selection signal that is received at the enable inputs and that selects the amount of delay, and is configured to provide the selected amount of delay to the signal generating circuit, which is further configured to incorporate the delay into the start signal.

2. The apparatus according to claim 1, wherein the signal generating circuit is further configured to incorporate the delay into the start signal between edges in the signal.

3. The apparatus according to claim 1, further comprising:
    a time determining circuit configured to determine the time at which an event occurred based on state information transferred from each of the delay elements.

4. The apparatus according to claim 1, wherein the delay selection signal provides an indication to each delay module whether the respective delay module is activated to generate delay.

5. The apparatus according to claim 1, wherein the signal generating circuit includes at least one flip-flop.

6. The apparatus according to claim 1, wherein each delay module includes at least one hardware based look up table (LUT).

7. The apparatus according to claim 1, wherein each delay module includes at least one flip-flop.

8. The apparatus according to claim 1, wherein the delay selection signal is determined by user input.

9. The apparatus according to claim 1, wherein the delay selection signal is determined by an algorithm which determines the optimal propagation delay for the TDC.

10. A method for inserting delay into a start signal of a metastable ring oscillator chain-based time-to-digital circuit (TDC), comprising:
    receiving a delay selection signal indicating a determination of an amount of delay to incorporate into the start signal;
    activating one or more delay modules based on the delay selection signal, the one or more delay modules selected from a plurality of carry elements connected as a chain;
    generating delay by routing a delay signal through an activated one of the one or more delay modules; and
    transmitting the delay signal to a signal generating circuit configured to generate the start signal to incorporate the delay signal.

11. The method according to claim 10, further comprising:
    receiving the delay signal at the signal generating circuit;
    generating a start signal incorporating the delay signal into the start signal;
    transmitting the start signal generated by the generating to the plurality of carry elements connected as a chain;
    receiving a stop signal at each of the plurality of carry elements;
    transmitting state information for each of the carry elements to a time determining circuit that determines the time at which an event occurred based on the state information.

12. The method according to claim 10, wherein the generating step further comprises generating delay by routing the delay signal through the activated one of the one or more delay modules and each delay module following the activated one of the one or more delay modules until the delay signal reaches a delay module designated as a final delay module.

13. The method according to claim 12, wherein the final delay module has a feedback line connected thereto.

14. The method according to claim 13, wherein the feedback line is connected to the signal generating circuit.

15. The method according to claim 10, wherein the generating delaying further comprises:
    generating delay by routing the start signal through a logic array block look-up table (LUT) of the activated one of the one or more delay modules.

16. A method of calibrating a metastable ring oscillator chain-based time-to-digital circuit (TDC), comprising:
    receiving a delay selection signal indicating a determination of an amount of delay to incorporate into the start signal;

activating one or more delay modules based on the delay selection signal, the one or more delay modules selected from a plurality of carry elements connected as a chain;

generating delay by routing a delay signal through an activated one of the one or more delay modules;

transmitting the delay signal to a signal generating circuit of the TDC which is configured to generate the start signal to incorporate the delay signal;

measuring performance of the TDC using the delay selection signal to obtain an evaluation value for the delay selection signal;

repeating the receiving, activating, generating, transmitting, and measuring step for each possible delay selection signal to obtain a corresponding evaluation value for each possible delay selection signal; and determining which of the possible delay selection signals results in a highest evaluation value.

* * * * *